United States Patent
Ozluturk

(10) Patent No.: US 6,728,225 B1
(45) Date of Patent: Apr. 27, 2004

(54) ASYMMETRICAL FORWARD/REVERSE TRANSMISSION BANDWIDTH

(75) Inventor: Fatih Ozluturk, Port Washington, NY (US)

(73) Assignee: InterDigital Technology Corporation, Wilmington, DE (US)

(*) Notice: Subject to any disclaimer, the term of this patent is extended or adjusted under 35 U.S.C. 154(b) by 0 days.

(21) Appl. No.: 09/501,865

(22) Filed: Feb. 10, 2000

(51) Int. Cl.[7] .............................................. H04B 7/216
(52) U.S. Cl. ..................... 370/320; 370/328; 370/342; 370/441; 370/468; 455/422; 455/464; 375/140
(58) Field of Search ................. 370/320, 328, 370/335, 342, 441, 468, 203, 206, 209; 455/422, 445, 446, 450, 464; 375/140, 141–145

(56) References Cited

U.S. PATENT DOCUMENTS

| | | | | |
|---|---|---|---|---|
| 5,592,469 A | * | 1/1997 | Szabo | 370/342 |
| 5,608,722 A | * | 3/1997 | Miller | 370/320 |
| 5,631,922 A | * | 5/1997 | Sekine et al. | 370/206 |
| 5,915,216 A | * | 6/1999 | Lysejko | 455/422 |
| 5,924,036 A | * | 7/1999 | Gustafson | 455/447 |
| 5,946,344 A | | 8/1999 | Warren et al. | |
| 6,028,868 A | * | 2/2000 | Yeung et al. | 370/515 |
| 6,031,845 A | * | 2/2000 | Walding | 370/468 |
| 6,097,733 A | * | 8/2000 | Basu et al. | 370/468 |
| 6,246,676 B1 | * | 6/2001 | Chen et al. | 370/342 |
| 6,421,334 B1 | * | 7/2002 | Baines | 370/342 |
| 6,452,941 B1 | * | 9/2002 | Bruhn | 370/468 |
| 6,459,689 B1 | * | 10/2002 | Czaja et al. | 370/331 |

FOREIGN PATENT DOCUMENTS

| | | | |
|---|---|---|---|
| EP | 0822679 A2 | * | 3/1997 |
| WO | WO9900911 | | 1/1999 |

* cited by examiner

Primary Examiner—Steven H. D Nguyen
Assistant Examiner—Roberta Stevens
(74) Attorney, Agent, or Firm—Volpe and Koenig, P.C.

(57) ABSTRACT

A wireless communications system employs code-division multiple access information transmission techniques where the uplink and downlink transmission bandwidths are unequal. The higher bandwidth is an integer multiple of the lower bandwidth. The present system requires a base station and a subscriber unit to have two pseudo-random code generators which can be clocked separately. Alignment of the uplink and downlink pseudo-random spreading codes is achieved by truncating the code sequence for the lower speed link at the conclusion of a complete code sequence for the higher speed link.

16 Claims, 5 Drawing Sheets

ASYMMETRICAL FORWARD/REVERSE TRANSMISSION BANDWIDTH

BACKGROUND

The present invention relates to wireless digital communications systems. More particularly, the present invention relates to code-division multiple access (CDMA) communication systems where a subscriber unit and a base station communicate with each other using different bandwidths.

CDMA systems provide an efficient use of the limited bandwidth of the RF spectrum, thereby permitting a greater amount of information transmission with less signal distortion than communications systems using other techniques, such as time division multiple access and frequency division multiple access.

In a CDMA communication system, an information signal at the transmitter is mixed with a pseudo-random spreading code which spreads the information across the entire bandwidth employed by the system. The spread signal is upconverted to an RF signal for transmission. A receiver, identified by the same pseudo-random code, downconverts the transmitted spread-spectrum signal and mixes the downconverted signal with the same pseudo-random code that was used to spread the original information signal to reproduce the original information signal.

A prior art CDMA communication system is shown in FIG. 1. The communication system has a plurality of base stations $20_1$, $20_2$, . . . $20_n$ connected together through land lines via a local public switched telephone network (PSTN) or by a wireless link. Each base station $20_1$, $20_2$, . . . $20_n$ communicates using spread spectrum CDMA transmissions with mobile and field subscriber unit stations $22_1$, $22_2$, . . . $22_n$ located within its cellular area.

In a typical prior art CDMA system, downlink bandwidth which is used by the base station to transmit to the subscriber unit, is the same as uplink bandwidth which is used by the subscriber unit to transmit to the base station. Symmetrical allocation of bandwidth is appropriate where the uplink and downlink data volumes are roughly equivalent, as in the case of voice communication. However, in some communication scenarios, allocation of equal bandwidth to uplink and downlink transmission is an inefficient use of the limited RF spectrum available to a wireless communication provider. For example, an individual using the Internet generally transmits a limited amount of data, which might include Internet addresses, search terms and typed responses to queries. In contrast, an Internet server generally responds to a user's request and the user receives large amounts of text, graphics and other forms of data. In this case, providing a larger downlink bandwidth for the transmission link from the base station to the subscriber and a smaller uplink bandwidth for transmission link from the subscriber to the base station permits a more efficient use of the total bandwidth allocated to the communication provider. Though the same total bandwidth is used in an asymmetrical bandwidth communication as in one where the uplink and downlink bandwidths are the same, in an asymmetrical communication the higher use downlink channel can send data more quickly by occupying a larger bandwidth without sacrificing performance of the uplink channel, which sends its limited quantity of data at a lower rate.

In a typical prior art CDMA system, a subscriber unit generates a pseudo-random spreading sequence which is repeated every 29,877,120 clock cycles. A full sequence is known in the art as an epoch. A prior art system 200 for generating a pseudo-random sequence is shown in FIG. 2. A data clock 202 is fed to a first code generator 204 which creates a pseudo-random sequence of 233,415 chips, and to a second code generator 206 which creates a pseudo-random sequence of 128 chips. The outputs of these two generators are combined to produce a pseudo-random sequence of 233,415×128, which is 29,877,120 chips long. At the end of the sequence, the code generators 204, 206 restart the code from the beginning of the sequence.

When a subscriber unit first begins to transmit, its pseudo-random sequence is freerunning. Its epoch is not synchronized with the epoch of the pseudo-random sequence being generated at the base station. Accordingly, the base station must search for the start of the pseudo-random code of the subscriber unit, which is a time-consuming process.

In a prior art system as described, the use of different bandwidths means that the pseudo-random spreading sequence is clocked at different rates for the uplink and the downlink. FIG. 3 shows epoch starting points for an uplink 120 and a downlink 100, where the downlink clock rate is twice that of the uplink. As shown, the starting points for the uplink epoch, 122 and 124, are aligned with every other downlink epoch starting point, 102 and 106. This creates an ambiguity in that the subscriber unit, which is attempting to decode downlink data, is unaware of the start of the downlink epoch. For a downlink transmission that begins in the uplink epoch starting at 122, the downlink starting point could be either 102 or 104. This ambiguity causes the subscriber unit to search the entire sequence to find the starting point. This process consumes an unacceptably long amount of time, thus rendering impractical the use of asymmetrical bandwidths.

Consequently, the need exists for a CDMA system where the pseudo-random spreading codes of the uplink and downlink remain synchronous when the uplink bandwidth differs from the downlink bandwidth.

SUMMARY

The present invention facilitates CDMA communication where the uplink and downlink transmission bandwidths are unequal. Asymmetric allocation of transmission bandwidth is advantageous where there is a disproportionate amount of information transmitted between uplink and downlink channels. In the present system, the higher bandwidth must be an integer multiple of the lower bandwidth. The system includes a base station and a subscriber unit which each have two pseudo-random code generators which can be clocked separately, two independent data clocks, and a modem interface which is capable of reading and writing data at different rates. Alignment of the uplink and downlink pseudo-random spreading codes is achieved by truncating the code sequence for the lower speed link at the conclusion of a complete code sequence for the higher speed link.

Objects and advantages of the present invention will become apparent after reading the detailed description of the presently preferred embodiment.

DETAILED DESCRIPTION OF THE PREFERRED EMBODIMENT(S)

Figure 1:
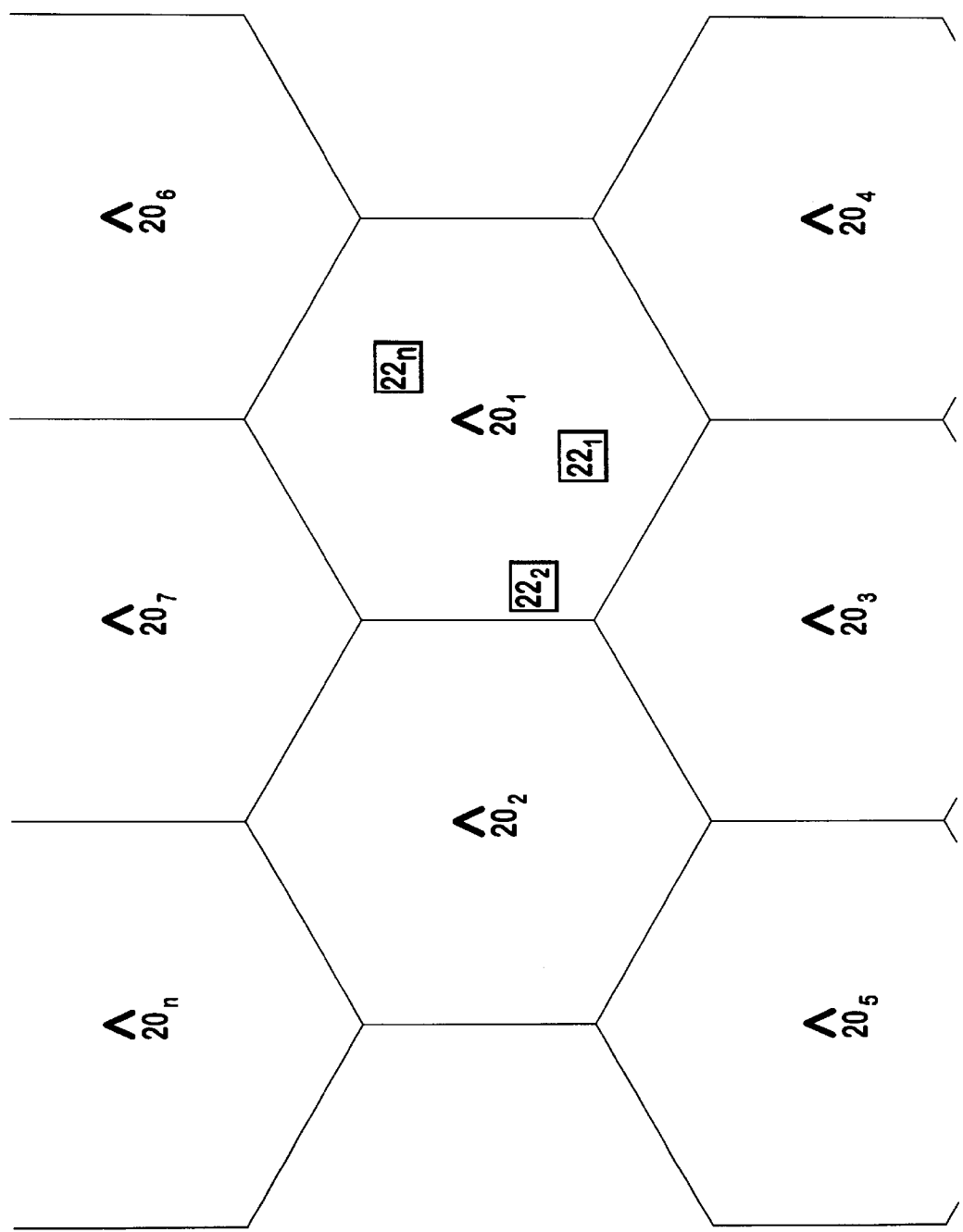
FIG. 1 is an illustration of a prior art CDMA system.
Figure 2:
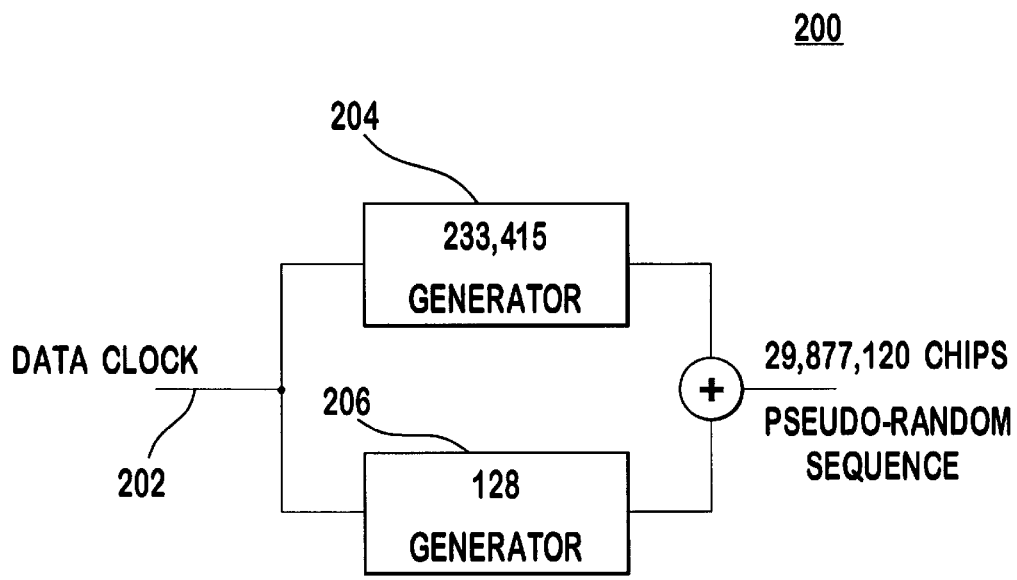
FIG. 2 is a block diagram of a prior art pseudo-random code sequence generator.

The preferred embodiments will be described with reference to the drawing figures where like numerals represent like elements throughout.

Figure 3:
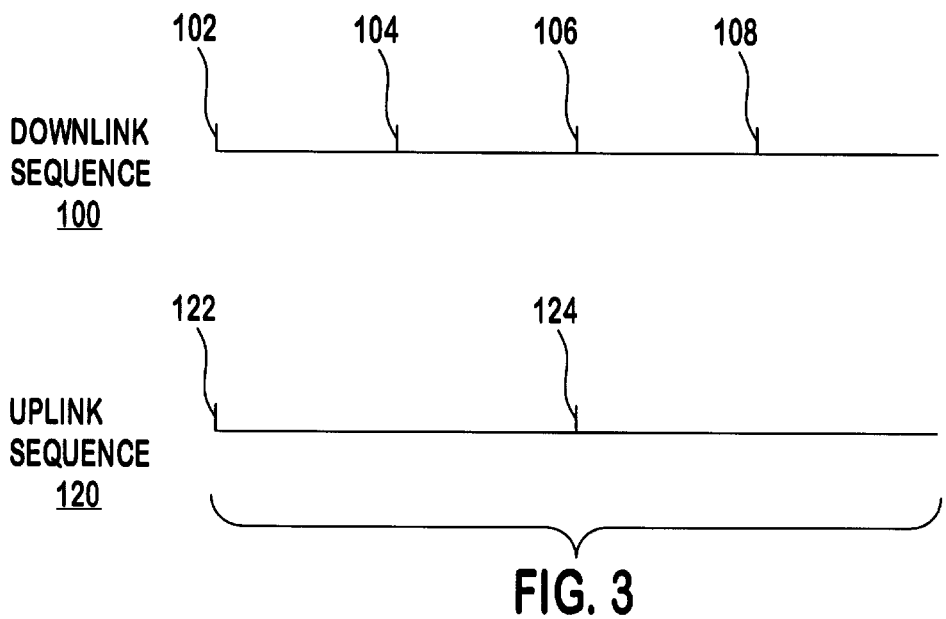
FIG. 3 is a diagram of spreading code epochs for different bandwidth uplink and downlink in a prior art system.

The present invention allows communication in a CDMA system where the uplink and downlink bandwidths are of different size and are integer multiples of each other. The problem is illustrated in FIG. 3, where epoch starting point ambiguity results when the pseudo-random code sequence epoch of one side of the communication, for example the downlink 100, is shorter than that of the other side of the communication, for example the uplink 120. This problem is addressed by truncating the pseudo-random code sequence of the lower bandwidth side of the communication at the end of the epoch for the higher bandwidth side.

Figure 4:
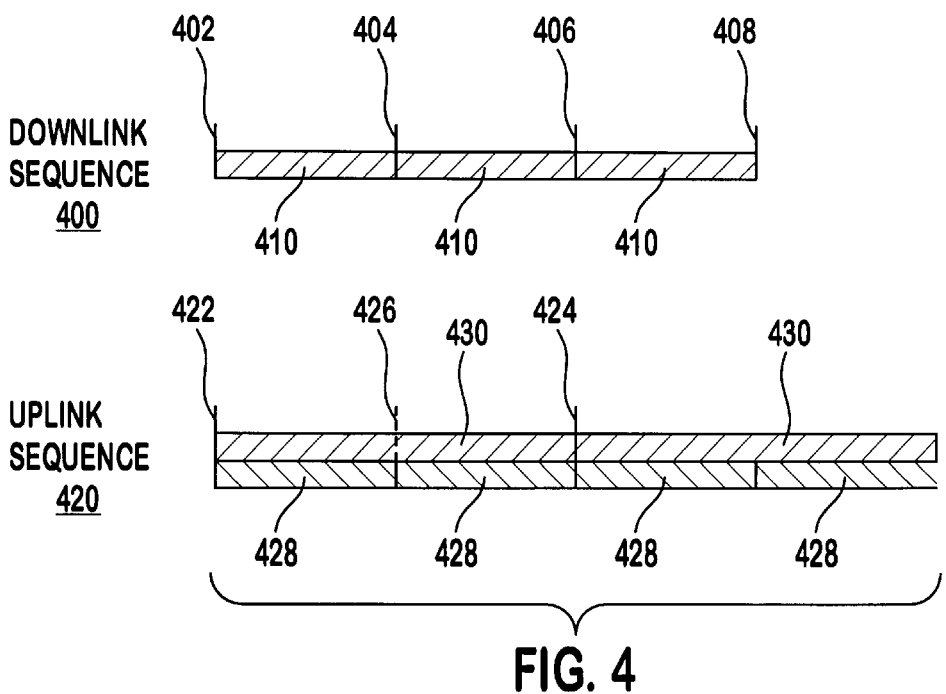
FIG. 4 is a diagram of spreading code epochs where the pseudo-random sequence of a path having a lower bandwidth is truncated when the pseudo-random sequence of a path having a higher bandwidth is completed in accordance with the present invention.

FIG. 4 shows epoch starting points for an uplink 420 and downlink 400, where the downlink clock-rate and bandwidth are twice those of the uplink. As shown, the starting points 422 and 424 for a complete uplink pseudo-random sequence 430 are aligned with every other starting point, 402 and 406 for a complete downlink pseudo-random sequence 410. In order to maintain alignment between starting points of every pseudo-random sequence, the present invention truncates the pseudo-random sequence for the lower bandwidth signal at the point where the higher repetition rate downlink sequence restarts 426. Hence, in the present invention, the communication side with the lower bandwidth and lower data rate produces a truncated pseudo-random sequence 428 that contains a fraction of the number of chips that are found in the full pseudo-random code sequence 430. In the example illustrated in FIG. 4, the ratio of downlink to uplink bandwidth is 2:1. Hence, the pseudo-random sequence for the uplink 428 would contain exactly one half the number of chips that are in the full sequence 430. Where the bandwidth ratio is 3:1, the lower bandwidth sequence would be one third of the full sequence, and so on for other bandwidth ratios.

Figure 5:
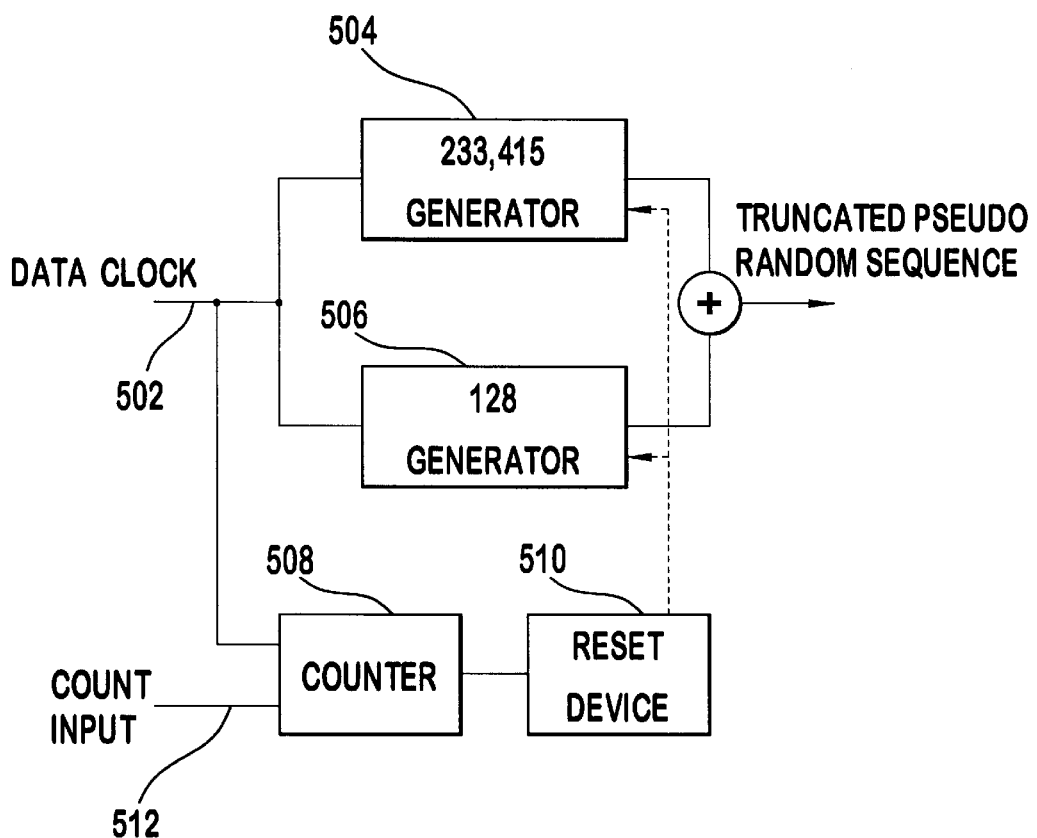
FIG. 5 is a block diagram of a pseudo-random code sequence generator made in accordance with the present invention.

Referring to FIG. 5, a pseudo-random sequence generator 500 is shown, which is capable of producing a truncated sequence in accordance with the present invention. The pseudo-random sequence generator 500 includes a data clock 502, a counter 508, a reset device 510 and two pseudo-random code generators 504,506. As should be well recognized by those of skill in the art, the required number of clock cycles depends upon the communication side with the higher bandwidth. Accordingly, this count is input into the counter 508 via a count input line 512. The counter 508 is loaded to count the number of clock cycles output by the data clock 502. When the required number of clock cycles has elapsed, the counter 508 signals a reset device 510, which resets the two code generators 504, 506.

The pseudo-random sequence generated by generator 504 contains 223,415 chips. This sequence is evenly divisible by 3, 5, 7, 9, 13 and 19. The pseudo-random sequence generated by generator 506 contains 128 chips. This sequence is evenly divisible by multiples of 2, up to 128. Hence, the full pseudo-random sequence of 29,877,120 chips is evenly divisible by 2, 3, 4, 5 and other combinations of the factors of 128 and 223,415. For uplink/downlink bandwidth ratios that match these factors, precise truncation of the full sequence is possible. The present invention enables the low bandwidth side of the communication to complete its truncated pseudo-random epoch at the same time that the high bandwidth side is completing its epoch.

Figure 6:
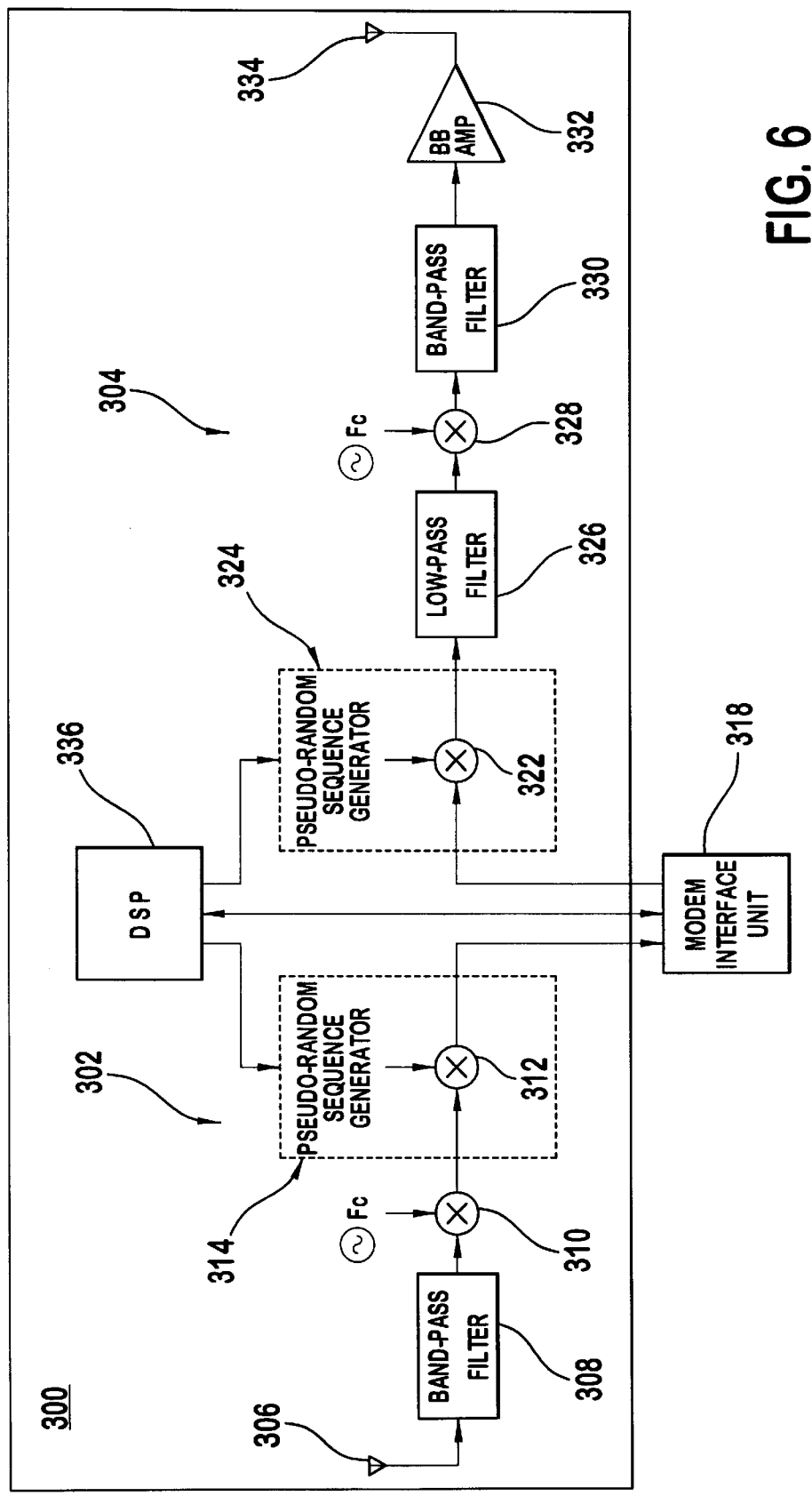
FIG. 6 is a block diagram of a base station made in accordance with the present invention.

A base station 300 made in accordance with the present invention is shown in FIG. 6. The base station 300 includes a receiver section 302, a transmitter section 304 and a modem interface unit 318. The modem interface unit 318 provides an interface between the receiver and transmitter sections 302, 304 of the base station 300 and the user. The modem interface unit 318 has an architecture and clocking that makes it possible to read and write data at different rates. This is made possible by using different and adjustable clock speeds. Details of such designs are known to those skilled in the art.

An antenna 306 receives a signal from the subscriber unit, which is filtered by a bandpass filter 308. The output of the filter 308 is downconverted by a mixer 310 to a baseband signal using a constant frequency (Fc) local oscillator. The output of the mixer 310 is then spread spectrum decoded at each modem by applying a pseudo-random sequence to a mixer 312 within the pseudo-random Rx sequence generator 314. The output of the mixer 312 is then forwarded to the modem interface unit 318.

For transmission, a baseband signal is received from the modem interface unit 318. Preferably, a 32 kb/s ADPCM signal is used. The ADPCM or PCM signal is applied to a mixer 322 within the pseudo-random Tx sequence generator 324. The mixer 322 multiplies the ADPCM or PCM data signal with the pseudo-random Tx sequence. The output of the mixer 322 is applied to low-pass filter 326. The output of the filter 326 is then applied to a mixer 328 and suitably up-converted. The up-converted signal is then passed through a band-pass filter 330 and to a broadband RF amplifier 332 which drives an antenna 334. Although two antennas 306, 334 are shown, the preferred embodiment includes a diplexer and only one antenna for transmission and reception.

The digital signal processor (DSP) 336 controls the acquisition process as well as the pseudo-random Rx and Tx sequence generators. 314, 324. In accordance with the present invention, the pseudo-random Rx and Tx sequence generators 314, 324 are clocked separately and independently by the DSP 336. Accordingly, the data clocks (not shown) for the pseudo-random Rx and Tx sequence generators 314, 324 are separate and independent.

For a link to be established, both the base station 300 and subscriber unit must know what chip rates are used for uplink 120 and downlink 100. This information may be exchanged between the base station 300 and the subscriber unit by sending each other messages containing this information at the time of every call establishment. Or, alternatively, this information, including chip rates used for uplink 120 and downlink 100 transmissions, may be a system parameter that is programmed into the subscriber unit and the base station 300.

Although the invention has been described in part by making detailed reference to certain specific embodiments, such details is intended to be instructive rather than restrictive. It will be appreciated by those skilled in the art that many variations may be made in the structure and mode of operation without departing from the spirit and scope of the invention as disclosed in the teachings herein.

What is claimed is:

1. A communication system utilizing spreading code sequences in both uplink and downlink data paths, the system comprising:

a downlink data path having a first bandwidth allocated thereto for sending a first repetitious code sequence at a first data rate;

an uplink data path having a second bandwidth allocated thereto for sending a second repetitious code sequence at a second data rate, the second bandwidth being larger than the first bandwidth;

a first generator in communication with the downlink path, the first generator outputting the first code sequence;

a second generator in communication with the uplink path, the second generator outputting the second code sequence, wherein the first code sequence is truncated each time the second code sequence is repeated.

2. The system of claim 1 wherein the second bandwidth is an integer multiple of the first bandwidth.

3. The system of claim 1 wherein the system is a code-division multiple access (CDMA) communication system.

4. A communication system utilizing spreading code sequences in both uplink and downlink data paths, the system comprising:

a downlink data path having a first bandwidth allocated thereto for sending a first repetitious code sequence at a first data rate;

an uplink data path having a second bandwidth allocated thereto for sending a second repetitious code sequence at a second data rate, the first bandwidth being larger than the second bandwidth;

a first generator in communication with the downlink path, the first generator outputting the first code sequence;

a second generator in communication with the uplink path, the second generator outputting the second code sequence, wherein the second code sequence is truncated each time the first pseudo code sequence is repeated.

5. The system of claim 4 wherein the first bandwidth is an integer multiple of the second bandwidth.

6. The system of claim 4 wherein the system is a code-division multiple access (CDMA) communication system.

7. A communication system utilizing spreading code sequences in both uplink and downlink data paths, the system comprising:

a base station;

a subscriber unit in communication with the base station via (i) a downlink data path having a first bandwidth allocated thereto for sending a first repetitious code sequence at a first data rate, and (ii) an uplink data path having a second bandwidth allocated thereto for sending a second repetitious code sequence at a second data rate, the second bandwidth being larger than the first bandwidth;

a first generator in communication with the downlink path, the first generator outputting the first code sequence;

a second generator in communication with the uplink path, the second generator outputting the second code sequence, wherein the first code sequence is truncated each time the second code sequence is repeated.

8. The system of claim 7 wherein the first bandwidth is an integer multiple of the second bandwidth.

9. The system of claim 7 wherein the system is a code-division multiple access (CDMA) communication system.

10. A communication system utilizing spreading code sequences in both uplink and downlink data paths, the system comprising:

a base station;

a subscriber unit in communication with the base station via (i) a downlink data path having a first bandwidth allocated thereto for sending a first repetitious code sequence at a first data rate, and (ii) an uplink data path having a second bandwidth allocated thereto for sending a second repetitious code sequence at a second data rate, the first bandwidth being larger than the second bandwidth;

a first generator in communication with the downlink path, the first generator outputting the first code sequence;

a second generator in communication with the uplink path, the second generator outputting the second code sequence, wherein the second code sequence is truncated each time the first code sequence is repeated.

11. The system of claim 10 wherein the second bandwidth is an integer multiple of the first bandwidth.

12. The system of claim 10 wherein the system is a code-division multiple access (CDMA) communication system.

13. A communication method utilizing spreading code sequences in both uplink and downlink data paths, the method comprising:

assigning a first bandwidth to a downlink data path;

assigning a second bandwidth to an uplink data path, the second bandwidth being larger than the first bandwidth;

applying a first repetitious code sequence to transmit data over the downlink path at a first data rate;

applying a second repetitious code sequence to transmit data over the uplink path at a second data rate; and truncating the first code sequence each time the second code sequence is repeated.

14. The method of claim 13 wherein the first bandwidth is an integer multiple of the second bandwidth.

15. A communication method utilizing spreading code sequences in both uplink and downlink data paths, the method comprising:

assigning a first bandwidth to a downlink data path;

assigning a second bandwidth to an uplink data path, the first bandwidth being larger than the second bandwidth;

applying a first repetitious code sequence to transmit data over the downlink path at a first data rate;

applying a second repetitious code sequence to transmit data over the uplink path at a second data rate; and truncating the second code sequence each time the first code sequence is repeated.

16. The method of claim 15 wherein the second bandwidth is an integer multiple of the first bandwidth.

* * * * *

UNITED STATES PATENT AND TRADEMARK OFFICE
CERTIFICATE OF CORRECTION

PATENT NO.   : 6,728,225 B1
DATED        : April 27, 2004
INVENTOR(S)  : Fatih Ozluturk It is certified that error appears in the above-identified patent and that said Letters Patent is hereby corrected as shown below:

<u>Column 5,</u>
Line 41, after "first" delete -- pseudo --.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

PATENT NO.        : 6,728,225 B1
APPLICATION NO.   : 09/501865
DATED             : April 27, 2004
INVENTOR(S)       : Fatih Ozluturk It is certified that error appears in the above-identified patent and that said Letters Patent is hereby corrected as shown below:

In the Specification

In Column 3, line 64, after the word "contains", delete "223,415" and insert therefor --233,415--.

In Column 4, line 3, after the words "of 128 and", delete "223,415" and insert therefor --233,415--.

Signed and Sealed this
Tenth Day of November, 2015

Michelle K. Lee
*Director of the United States Patent and Trademark Office*